United States Patent
Ratner (10) Patent No.: US 9,346,532 B1
(45) Date of Patent: May 24, 2016

(54) FILL PORT FOR A BALLOON

(71) Applicant: Google Inc., Mountain View, CA (US)

(72) Inventor: Daniel Ratner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 16 days.

(21) Appl. No.: 14/546,144

(22) Filed: Nov. 18, 2014

(51) Int. Cl.
*B64B 1/62* (2006.01)

(52) U.S. Cl.
CPC .......................... *B64B 1/62* (2013.01)

(58) Field of Classification Search
USPC ................. 446/220–226; 244/98, 31
See application file for complete search history.

(56) References Cited

U.S. PATENT DOCUMENTS

| | | | | | |
|---|---|---|---|---|---|
| 4,416,433 | A | * | 11/1983 | Bellina | F21V 3/023 116/210 |
| 4,586,456 | A | * | 5/1986 | Forward | B63C 9/20 116/210 |
| 6,182,924 | B1 | * | 2/2001 | Nott | B64B 1/44 244/61 |
| 6,628,941 | B2 | * | 9/2003 | Knoblach | H04B 7/18576 455/431 |
| 7,275,496 | B2 | | 10/2007 | French et al. | |
| 7,341,224 | B1 | * | 3/2008 | Osann, Jr. | B64C 39/028 244/30 |
| 7,344,267 | B2 | * | 3/2008 | Carito | A63H 27/10 362/189 |
| 7,356,390 | B2 | * | 4/2008 | Knoblach | B64B 1/40 244/31 |
| 7,478,779 | B2 | * | 1/2009 | Nguyen | F21V 3/023 244/24 |
| 7,568,656 | B2 | * | 8/2009 | Handley | B64B 1/06 244/24 |
| 7,934,522 | B2 | * | 5/2011 | Liao | B65D 81/052 141/10 |
| 8,505,847 | B2 | * | 8/2013 | Ciampa | B64B 1/62 244/24 |
| 8,814,084 | B2 | * | 8/2014 | Shenhar | A63H 27/10 244/128 |
| 8,998,128 | B2 | * | 4/2015 | Ratner | B64B 1/62 244/31 |
| 9,027,877 | B1 | * | 5/2015 | Brookes | B64B 1/58 137/223 |
| 2010/0270425 | A1 | * | 10/2010 | Zur | B64B 1/40 244/33 |
| 2012/0312911 | A1 | * | 12/2012 | Heppe | B64B 1/06 244/2 |
| 2014/0124616 | A1 | | 5/2014 | Greco et al. | |
| 2014/0158823 | A1 | | 6/2014 | Smith et al. | |

* cited by examiner

Primary Examiner — Christopher P Ellis
(74) Attorney, Agent, or Firm — Lerner, David, Littenberg, Krumholz & Mentlik, LLP (57) ABSTRACT

A system for filling balloons with lift gas is provided. The system includes apparatus for use with a balloon envelope of a balloon. This apparatus includes a main body having first and second portions. The first portion has a fill port and a hollow tube portion in communication with the fill port. The second portion has a surface and is insertable into a predefined opening in the balloon envelope. The surface of the second portion is configured to attach to an inner portion of the balloon envelope when the second portion is inserted in the predefined opening.

20 Claims, 8 Drawing Sheets

FILL PORT FOR A BALLOON

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

Before a balloon can be deployed, the balloon envelope must be inflated with lighter than air lift gases, such as helium, hydrogen or other types of gases. As an example, an interface, such as a small fill tube, may be attached to a top plate on the balloon and coupled to a filling hose for filling the envelope with gas. However, this interface is often prone to leaking and the top plate can sag or can otherwise become prolapsed into the balloon, thereby possibly causing damage to the balloon envelope, if there is not sufficient pressure at the top of the balloon to support the plate's weight.

BRIEF SUMMARY

Aspects of the present disclosure are advantageous for providing an apparatus for use with a balloon envelope. In one aspect, the apparatus may include a main body having first and second portions. The first portion may have a fill port and a hollow tube portion in communication with the fill port. The second portion has a surface and is insertable into a predefined opening in the balloon envelope. The surface of the second portion may be configured to be attached to an inner portion of the balloon envelope when the second portion is inserted in the predefined opening.

In one example, the apparatus further includes a bonding device coupled to the surface of the second portion. The bonding device may be configured to cause a portion of the surface to make contact with the inner portion of the balloon envelope in order to bond the two portions together. In this regard, the bonding device may include an inflatable balloon disposed within the balloon envelope. This inflatable balloon, when inflated, may be configured to press the portion of surface of the second portion against the portion of the balloon envelope. An adhesive may be disposed on the surface of the second portion to form an airtight seal between the second portion and the balloon envelope.

In another example, the first portion of the apparatus may be configured to receive one or more tendons for supporting the balloon envelope. A plurality of threads may be attached to the first portion. These threads may be configured to receive a fastener to secure the tendons to the balloon envelope. In that regard, the fastener may be a retaining nut threadably attached to the first portion.

In yet another example, the second portion may be cylindrically shaped and the first portion may be configured to receive a lift line to lift the balloon envelope. A cap portion may be attached to the fill port of the value body. The cap portion may be configured to seal the fill port so as to prevent lift gas from passing through the hollow tube portion.

In another aspect, a system is provided. The system may include a balloon having a balloon envelope and an apparatus for use with the balloon envelope. The apparatus may include a main body having first and second portions. The first portion may have a fill port and a hollow tube portion in communication with the fill port. The second portion has a surface and is insertable into a predefined opening in the balloon envelope. The surface of the second portion may be configured to be attached to an inner portion of the balloon envelope when the second portion is inserted in the predefined opening.

DETAILED DESCRIPTION

The present disclosure generally relates to providing a fill port apparatus for filling balloons with lift gas. In some aspects, these balloons may include high altitude balloons such as those used in communication networks. These communication networks may include hundreds of thousands of balloons that are deployed in the stratosphere at the same time. The fill port apparatus may increase the overall efficiency in filling and readying such balloons for deployment.

In one embodiment, the fill port apparatus may include a bell shaped valve body having first and second portions. The first portion of the valve body may include a hollow tube and a fill port in communication with the hollow tube. The second portion may have a large cylindrically shaped surface that can be inserted into a predefined opening in a given balloon envelope. The surface of the valve body may provide the fill port apparatus with a contact area for attaching to the envelope material. Hence, the larger this surface is configured, the larger the contact area. In one example, the valve body may be made of certain type of flexible material, such as a continuous thermoplastic polymer.

The fill port apparatus may also include a sealing device coupled to the surface of the valve body. The sealing device may be configured to cause the surface to make contact with the balloon envelope in order to bond the two together. In one example, the sealing device may include an inflatable balloon disposed within the balloon envelope. An adhesive may be disposed on the surface of the valve body. When the inflatable balloon is inflated, it may press a portion of the surface of the valve body onto a portion of the balloon envelope. In this regard, the adhesive may form a seal between the surface of the valve body and the portion of the balloon envelope when the two portions are pressed together.

In some examples, the fill port apparatus may further include a plurality of threads attached to the fill port. These threads may be configured to receive a lifting device for lifting the balloon envelope during assembly or to receive one or more tendons for supporting the balloon envelope.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

Example System

Figure 1:
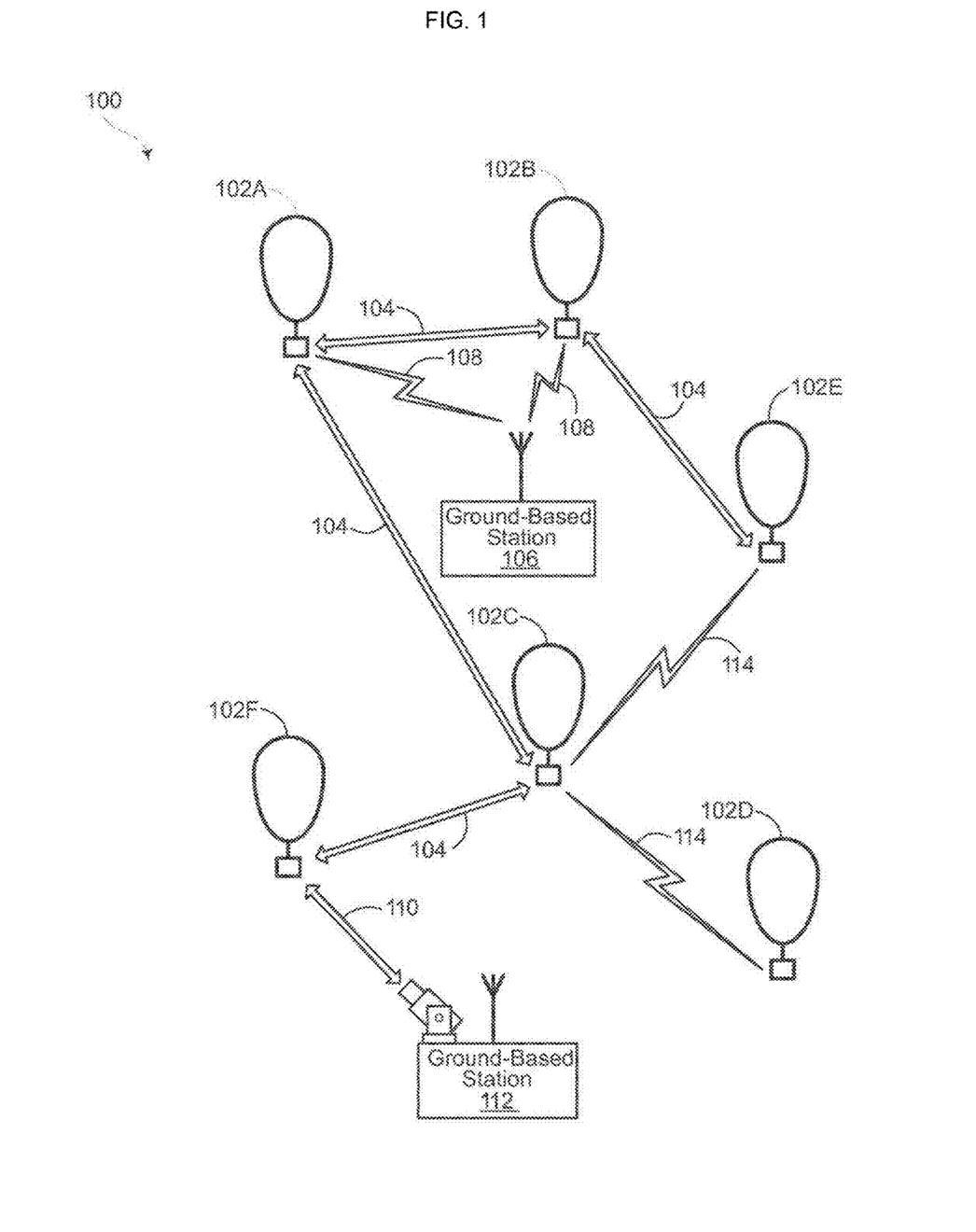
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
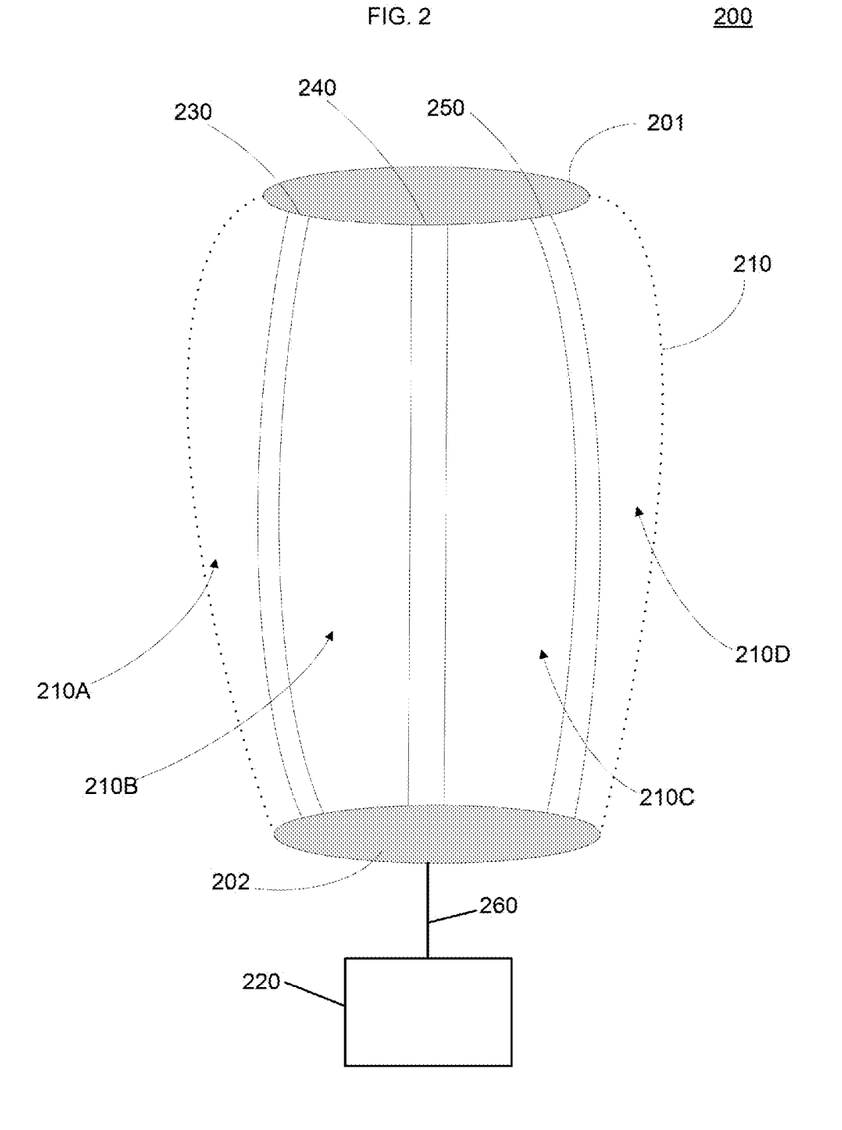
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 220, may be disposed at a base or bottom of the balloon envelope 210. The top cap 201 at the apex may be the same size and shape as and bottom cap 220 at the bottom. Both caps include corresponding components for attaching the tendons 230, 240 and 250 to the balloon envelope 210.

Example Apparatus

Figure 3A:
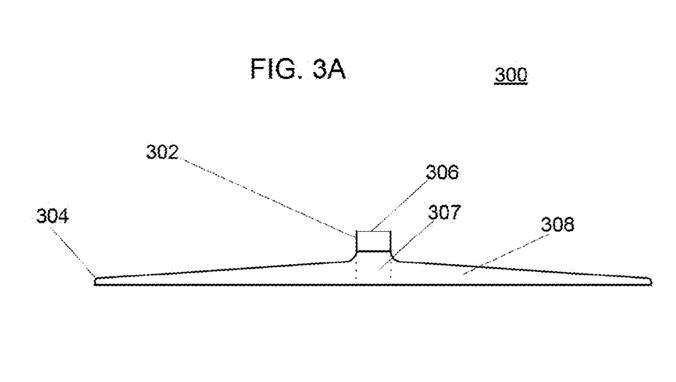
FIGS. 3A-3B are example views of an apparatus in accordance with aspects of the present disclosure.
Figure 3B:
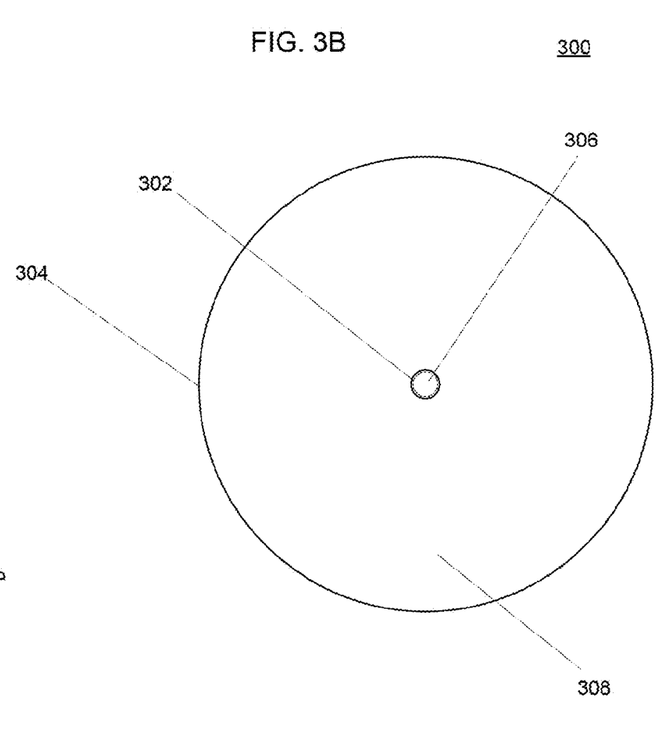

As noted above, one aspect of the present technology provides an apparatus to be used as a fill port for a high altitude balloon, such as balloon envelope 210 as described above. FIGS. 3A and 3B illustrate an example fill port apparatus 300. In FIG. 3A, a side view of the apparatus 300 is shown. In this example, apparatus 300 may include a first portion 302 and a second portion 304. The first portion 320 of apparatus 300 includes a fill port 306 for inflation of the balloon envelope and a hollow tube portion 307 in communication with the fill port 306. The fill port 306 can be coupled to a lift gas fill source (not shown), which can be used to inflate the balloon.

During inflation, the fill port 306 may allow lift gas to pass through to the hollow tube portion 307 and into an inner portion of the envelope. The hollow tube portion 307 may thus define a flow channel for the lift gas to travel and may extend axially through the apparatus 300 in order to allow the lift gas to reach the inner portion of the envelope.

FIG. 3B is a top down view of the apparatus 300. As shown, the second portion 304 of apparatus 300 may be cylindrically shaped and have a radius that is wider than the radius of the first portion 302. The shape and size of the second portion 304 may be configured so that the apparatus 300 can make a sufficient amount of contact with the balloon envelope 210 in order to bond the surface of the second portion 304 with a portion of the balloon envelope material. For example, when the apparatus 300 is attached to the balloon envelope, surface 308 of the second portion 304 may make contact with a portion of the balloon envelope.

Apparatus 300 may be attached to the balloon envelope 210 during the manufacturing process of the balloon 200. For example, before the balloon envelope 210 is completed, the second portion 304 may be inserted into an opening in the balloon envelope, for example, at an apex of the balloon 200. In this regard, the second portion 304 made be of a lightweight yet resistibly flexible material, such as type of rubber or other types similar material, which can be manipulated and return to into an original shape. When the second portion 304 is inserted in the opening of the balloon envelope 210, the surface 306 of the second portion 304 can be configured to attach to what will become an inner portion of the balloon envelope. As noted above, a bonding seal may be formed between the second portion 304 of the apparatus 300 and the balloon envelope 210 as discussed in more detail below. This seal may prevent lift gas from leaking out of the opening of the envelope.

Figure 4A:
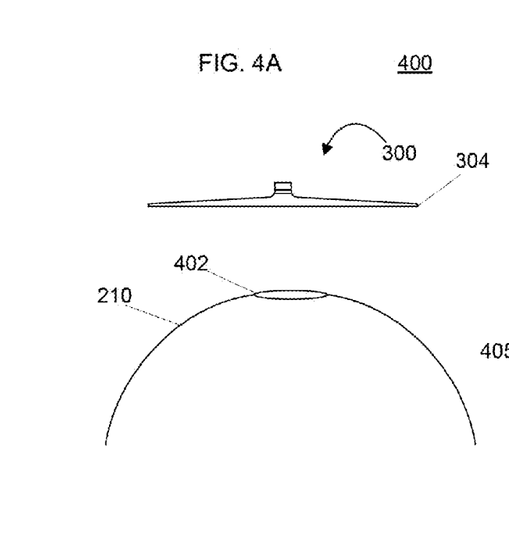
FIGS. 4A-4C are examples of the apparatus of FIG. 3 positioned relative to a balloon envelope in accordance with aspects of the present disclosure.
Figure 4B:
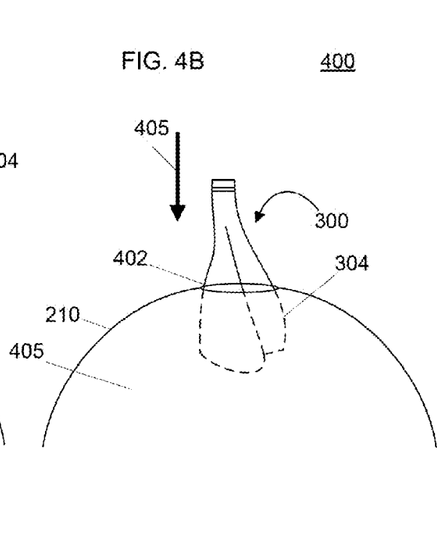
Figure 4C:
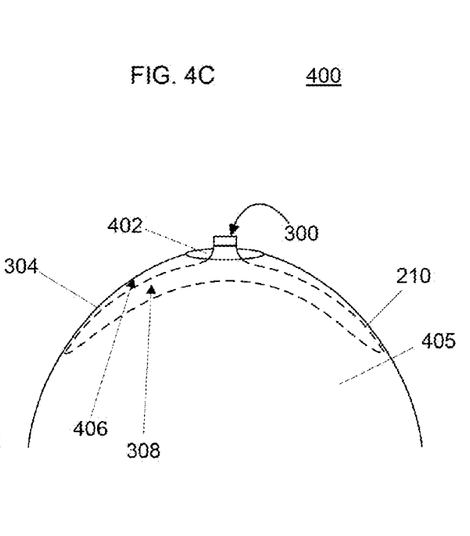

FIGS. 4A-4C are examples 400 of apparatus 300 positioned relative to a balloon envelope 210. With regards to FIG. 4A, the apparatus 300 is shown at an opening 402 in the balloon envelope 210. As shown here, the apparatus 300 is in a first unfolded shape. For example, the second portion 304 when unfolded may have a cylindrical shape that may correspond to a shape of the opening 402 at the apex of the balloon envelope 210.

The opening 402 in the balloon envelope 210 may be formed in several ways. In one example, the opening 420 can be preconfigured to be included at the time the balloon envelope 210 is manufactured. In another example, the opening 402 can be created by cutting open a portion of the balloon envelope 210 using any conventional cutting device. Various other techniques can be used to create the opening 402 in the balloon envelope 210. The opening 402 may be sized, so that the second portion 304 of the apparatus 300 cannot pass through after being fully inserted into the balloon envelope 210 and unfolded.

Turning to FIG. 4B, the second portion 304 of the apparatus 300 is shown in a partial dashed line as this feature may be located within an interior 405 of the balloon envelope 210. The second portion 304 of the apparatus 300 may be inserted through opening 402 in the direction of arrow 405. For example, as shown in FIG. 4B, the second portion 304 can be folded into a shape that can fit through the opening 402. As noted above, the second portion 304 may be made of a resistibly flexible material, such as rubber, that can be manipulated then return to an original shape. The second portion 304 is then inserted through the opening 402 and will become a part of the interior of the balloon envelope 210 when the envelope is completed.

In FIG. 4C, the second portion 304 of apparatus 300 is shown completely dashed line as this portion 304 may be completely located within the interior 405 of the balloon envelope 210. After insertion of the second portion 304 through the opening 402, apparatus 300 may return to the original shape. For example, the second portion 304 of the apparatus 300 may unfold and extend along contours of the interior 405 of balloon envelope 210. As shown here, surface 308 of the apparatus 300 may be positioned below the opening 402 and towards a portion 406 of the interior 405.

Once the surface 308 of the second portion 304 is positioned below the opening 402, this surface may be bonded to the interior 405 of balloon envelope 210 as discussed in more detail below. This bond may be configured to create a substantially airtight seal between the second portion 304 and the balloon envelope 210. The airtight seal helps prevent lift gas from escaping from the opening 402 when balloon envelope 210 is inflated.

Figure 5A:
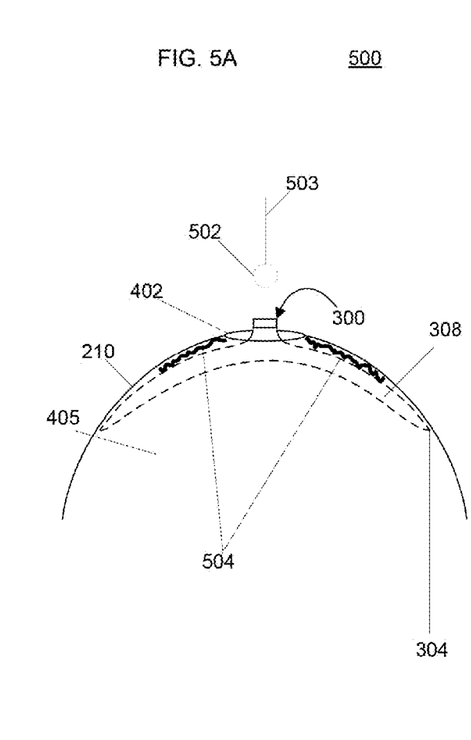
FIGS. 5A-5C are examples of a bonding technique in accordance with aspects of the present disclosure.
Figure 5B:
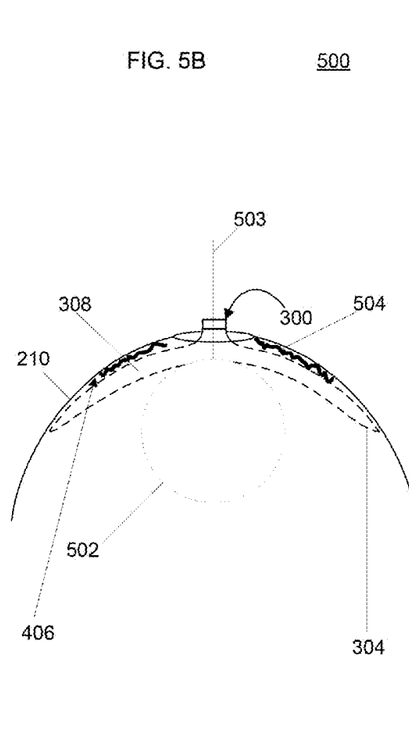
Figure 5C:
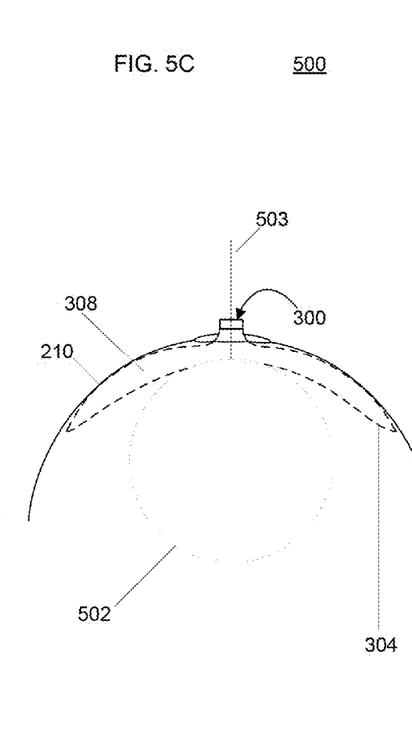

FIGS. 5A-5C illustrates one example of a bonding technique 500, for example, to create an airtight seal between apparatus 300 and the balloon envelope 210. This is merely one example of a bonding technique as other sealing and/or bonding methods may be used to create the airtight seal. In this example, the bonding technique 500 includes using an inflatable balloon 502 attached to an inflation hose 503 and an adhesive 504, such as type of epoxy. The inflatable balloon 502 may be used to cause a portion of the apparatus 300 to make contact with an interior 405 of the balloon envelope 210 in order to bond the two portions together.

As shown in FIG. 5A, the adhesive 504 may be disposed on surface 308 of apparatus 300. For example, the adhesive 504 may be applied to the surface 308 before or after the insertion of the second portion 304 through opening 402. The inflatable balloon 502 may be then inserted through the fill port of the apparatus 300 so that the inflatable balloon 502 may rest within the interior 405 of the balloon envelope 210. In this regard, an initial size of the inflatable balloon 502 may be small enough to pass through the fill port of apparatus 300.

In FIG. 5B, the inflatable balloon 502 is shown slightly inflated. For example, upon activation of an air pump (not shown) attached to the inflation hose 503, air may be pumped through the inflation hose 503 at a certain rate that gradually increases the size of the inflatable balloon 502. As the size of the inflatable balloon 502 increases, surface 308 of apparatus 300 may be brought closer to an interior wall 406 of the balloon envelope 210, thereby pressing the surface 308 of the second portion 304 against a portion of the wall.

In FIG. 5C, the inflatable balloon 502 is shown even more inflated than in FIG. 5B. Here, the surface 308 of the second portion 304 of apparatus 300 is shown in contact with the interior wall 406 of the balloon envelope 210. As noted above, the adhesive 504 disposed between the two portions may be used form an airtight seal. For example, the adhesive 504 when cured may cause surface 308 to bond with the interior wall 406 of the balloon envelope 210. Thereupon, the inflatable balloon 502 may be deflated and retracted from the interior of the envelope 210 by using the inflation hose 503.

Once the apparatus is secured to the balloon envelope, the envelope and balloon may be completed. For example, other components (e.g., tendons) of the balloon may be secured to the balloon envelope 210 to ready the balloon for deployment. The completed balloon may then be inflated using the apparatus as discussed above. For example, the completed balloon may be attached to a lift gas fill source via the fill port of the apparatus 300 in order to fill the envelope 210 with lift gas. In some aspects, the apparatus may be used to help secure the other components of the balloon as discussed above in order to produce a completed balloon. These further aspects of the apparatus of the present disclosure are discussed below.

Figure 6:
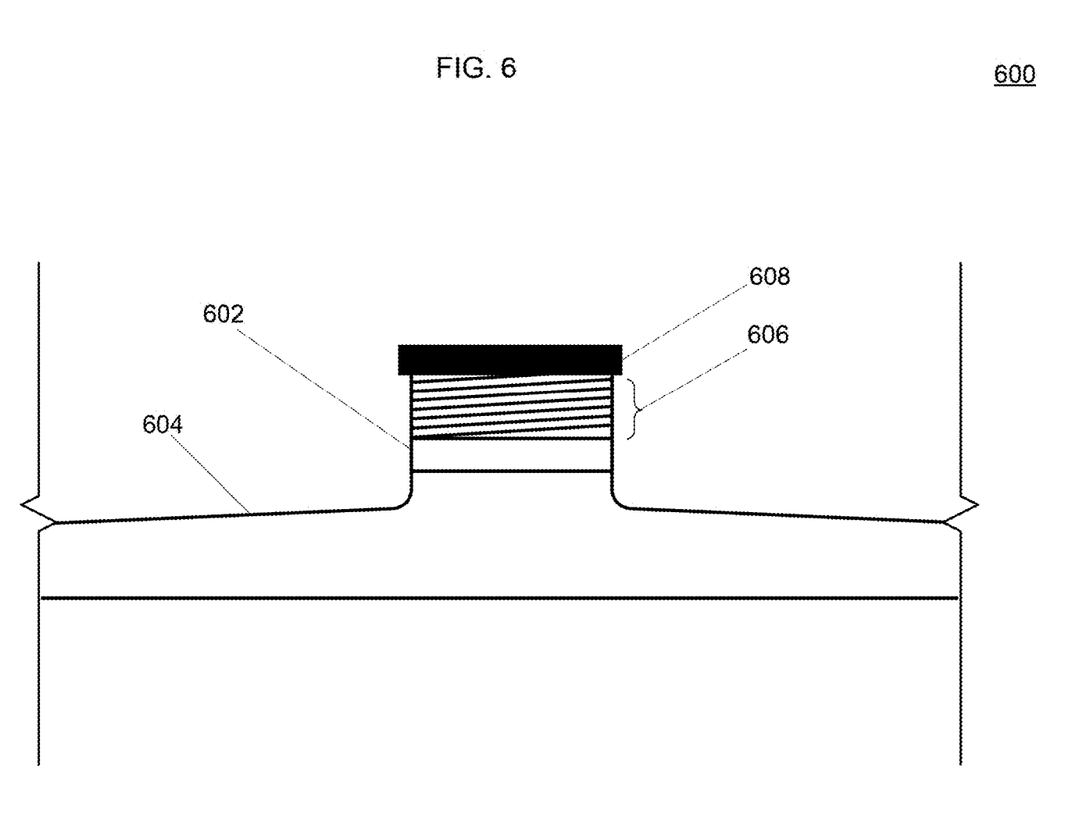
FIG. 6 is another example of an apparatus in accordance with aspects of the present disclosure.

FIG. 6 is another example of an apparatus 600 for example, to be used as a fill port for a high-altitude balloon. Apparatus 600 may be compared to the apparatus 300 of FIGS. 3A-3B and thus may be bonded to a balloon envelope using the bonding technique 500 described above. Similarly, apparatus 600 includes a first portion 602 having a fill port and hollow tube portion (not shown) and a second portion 602 that is attachable to a balloon envelope. The first portion 602 and second portion 604 may be compared to first portion 302 and second portion 304, respectively. In this example, the first portion 602 includes a plurality of threads 606. In one example, the threads 606 may be configured to receive a cap 608. The cap 608 may be used to help prevent lift gas from passing through the fill port of the apparatus 600. For example, after the balloon envelope is inflated, the cap 608 may be attached to the threads 606 in order to help keep the fill port closed.

Figure 7:
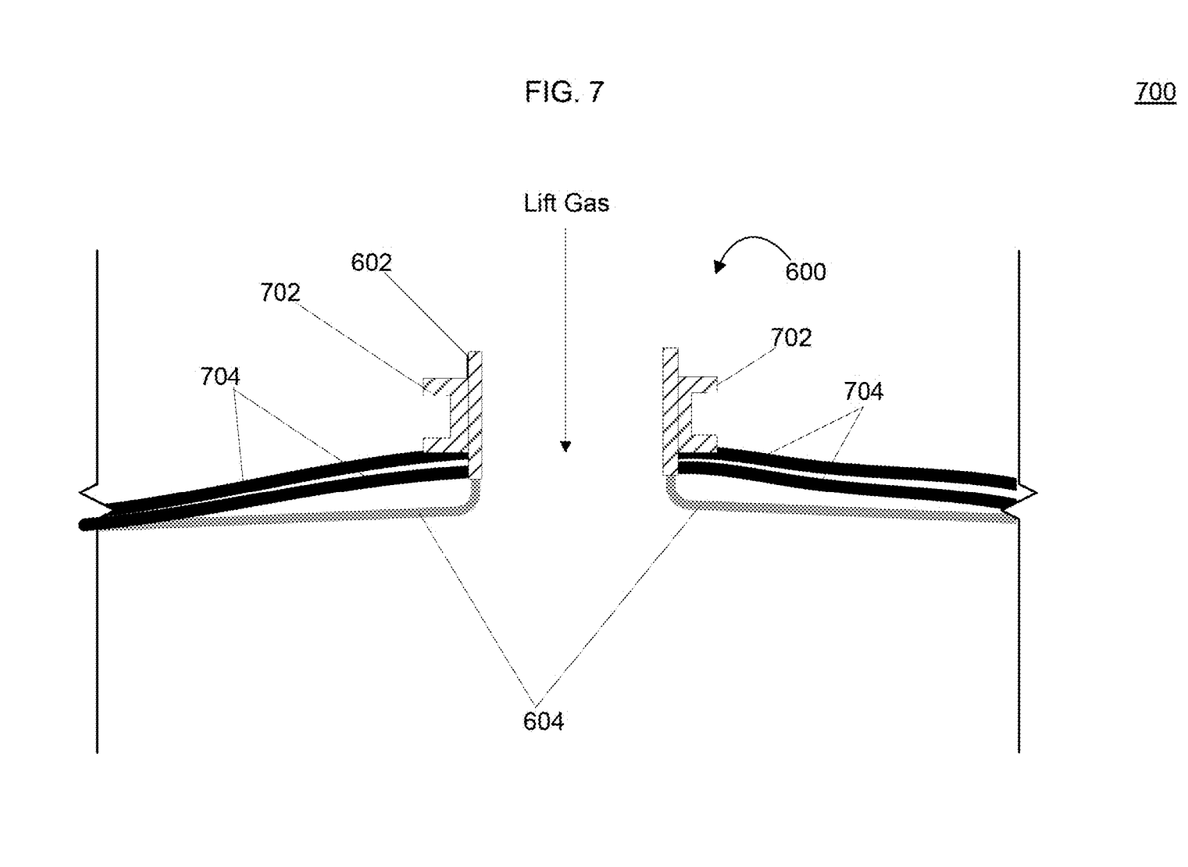
FIG. 7 is a cross-sectional view of the apparatus of FIG. 6 in accordance with aspects of the present disclosure.

FIG. 7 is a cross sectional view of the apparatus 600 of FIG. 6. In this example, apparatus 600 may be further configured to receive one or more tendons 704. Although only two tendons are shown, any number of tendons may be used as needed to complete a balloon such as balloon 200. The tendons 704 can be looped around the first portion 602 of apparatus 600. In this regard, the first portion 602 may be configured to extend a sufficient length outwardly from an apex of the balloon envelope in order to accommodate the tendons 704. As discussed above, the tendons 704 may provide support of supporting a load of lift gas carried by the balloon envelope.

To secure the tendons to apparatus 600, the first portion 602 may be configured to receive a fastener 702. The fastener 702 may ensure that when the tendons 704 are placed at the apex they will not fall off of the balloon envelope. Fastener 702 may include one or more various different types of clips, nuts, pins or other types of hardware devices. For example, the fastener 702 may include a retaining nut. In this example, the retaining nut may be threadably attached to the first portion 602 by using a twisting motion that may tightly secure the tendons 704 in place.

In other aspects, apparatus 600 may be configured to receive a lift line. For example, a lifting device (such as a hoist) may be coupled to the apparatus 600 via the lift line in order to lift the balloon envelope during assembly. An advantage of using the apparatus 600 to help lift the balloon is that may help to eliminate the need to include additional attachment features for lifting the balloon envelope.

Figure 8A:
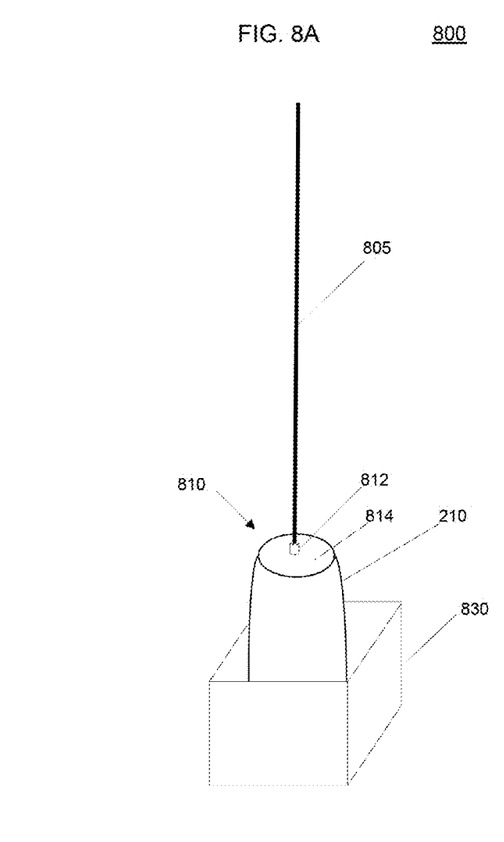
FIGS. 8A-8C are examples of an apparatus coupled to lift line in accordance with aspects of the present disclosure.
Figure 8B:
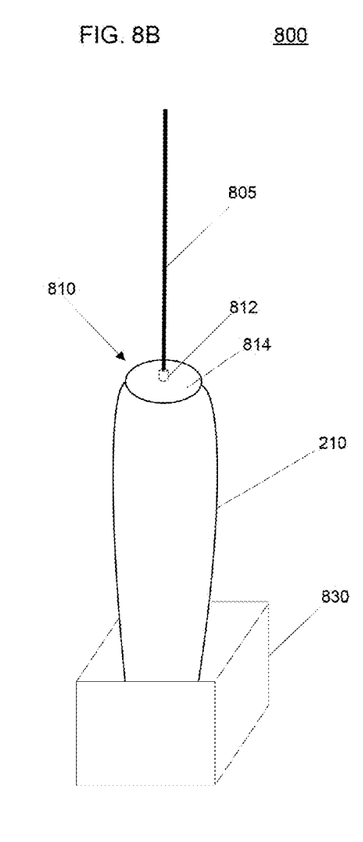
Figure 8C:
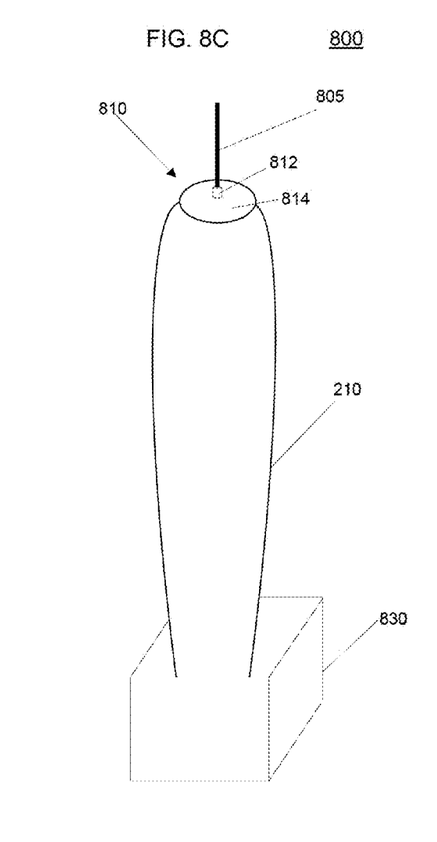

Turning to FIGS. 8A-8C, an example 800 of an apparatus 810 coupled to a lift line 805, is shown. In this example, apparatus 810 may be compared to apparatus 300 and apparatus 600 and thus may be bonded to a balloon envelope using the bonding technique 500 described above. Similarly here, apparatus 810 includes a first portion 812 having a fill port and hollow tube portion (not shown) and a second portion 814 attached to balloon envelope 210. First portion 812 and second portion 814 may be compared to the first and second portions 302, 304, 602, and 604, respectively.

In FIG. 8A, the balloon envelope 210 is shown coming out of a box 830, such as a shipping box for the envelope 210. As shown, the apparatus 810 is attached to an apex of the balloon envelope 210. Here, the balloon envelope is being pulled upward, for example, by a hoisting device (not shown) using lift line 805. In FIG. 8B, the balloon envelope 210 is even higher out of the box 830. And in FIG. 8C, shows the balloon envelope 210 at another height. For example, this may be a height high enough to accommodate the fully inflated balloon envelope 210. At this point, the balloon envelope 210 may be inflated and prepared for deployment.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An apparatus for use with a balloon envelope, the apparatus comprising:
   first and second portions, the first portion having a fill port and a hollow tube portion in communication with the fill port and the second portion having a surface and is insertable into a predefined opening in the balloon envelope,
   wherein the surface is configured to attach to an inner portion of the balloon envelope when the second portion is inserted in the predefined opening.

2. The apparatus of claim 1, wherein the second portion is cylindrically shaped.

3. The apparatus of claim 1, further comprising a bonding device coupled to the surface of the second portion, the bonding device being configured to cause a portion of the surface to make contact with the inner portion of the balloon envelope in order to bond the two portions together.

4. The apparatus of claim 3, wherein the bonding device includes an inflatable balloon disposed within the balloon envelope, the inflatable balloon, when inflated, is configured to press the portion of surface of the second portion against the portion of the balloon envelope.

5. The apparatus of claim 4, further comprising an adhesive disposed on the surface of the second portion, the adhesive being configured to form an airtight seal between the second portion and the balloon envelope.

6. The apparatus of claim 1, wherein the first portion is configured to receive one or more tendons for supporting the balloon envelope.

7. The apparatus of claim 6, further comprising a plurality of threads attached to the first portion, the plurality of threads being configured to receive a fastener to secure the tendons to the balloon envelope.

8. The apparatus of claim 7, wherein the fastener is a retaining nut threadably attached to the first portion.

9. The apparatus of claim 1, wherein the first portion is further configured to receive a lift line to lift the balloon envelope.

10. The apparatus of claim 1, further comprising a cap portion attached to the fill port of the value body, the cap portion being configured to seal the fill port so as to prevent lift gas from passing through the hollow tube portion.

11. A system, comprising:
    a balloon having a balloon envelope; and
    an apparatus for use with the balloon envelope, the apparatus comprising
       first and second portions, the first portion having a fill port and a hollow tube portion in communication with the fill port and the second portion having a surface and is insertable into a predefined opening in the balloon envelope,
       wherein the surface is configured to attach to an inner portion of the balloon envelope when the second portion is inserted into the predefined opening.

12. The system of claim 11, wherein the second portion of is cylindrically shaped.

13. The system of claim 11, further comprising: a bonding device coupled to the surface of the second portion, the bonding device being configured to cause a portion of the surface to make contact with the inner portion of the balloon envelope in order to bond the two portions together.

14. The system of claim 13, wherein the bonding device includes an inflatable balloon disposed within the balloon envelope, the inflatable balloon, when inflated, is configured to press the portion of surface of the second portion against the portion of the balloon envelope.

15. The system of claim 14, further comprising an adhesive disposed on the surface of the second portion, the adhesive being configured to form an airtight seal between the second portion and the balloon envelope.

16. The system of claim 11, wherein the first portion is configured to receive one or more tendons for supporting the balloon envelope.

17. The system of claim 16, further comprising a plurality of threads attached to the first portion, the plurality of threads being configured to receive a fastener to secure the tendons to the balloon envelope.

18. The system of claim 17, wherein the fastener is a retaining nut threadably attached to the first portion.

19. The system of claim 11, wherein the first portion is further configured to receive a lift line to lift the balloon envelope.

20. The system of claim 11, wherein the apparatus further includes a cap portion attached to the fill port of the value body, the cap portion being configured to seal the fill port so as to prevent lift gas from passing through the hollow tube portion.

* * * * *